United States Patent
de la Puente et al.

(10) Patent No.: US 8,242,796 B2
(45) Date of Patent: Aug. 14, 2012

(54) TRANSMIT/RECEIVE UNIT, AND METHODS AND APPARATUS FOR TRANSMITTING SIGNALS BETWEEN TRANSMIT/RECEIVE UNITS

(75) Inventors: Edmundo de la Puente, Cupertino, CA (US); David D. Eskeldson, Colorado Springs, CO (US)

(73) Assignee: Advantest (Singapore) Pte Ltd, Singapore (SG)

( * ) Notice: Subject to any disclaimer, the term of this patent is extended or adjusted under 35 U.S.C. 154(b) by 701 days.

(21) Appl. No.: 12/276,299

(22) Filed: Nov. 21, 2008

(65) Prior Publication Data
US 2009/0212882 A1 Aug. 27, 2009

Related U.S. Application Data

(63) Continuation-in-part of application No. 12/035,378, filed on Feb. 21, 2008.

(51) Int. Cl.
*G01R 31/02* (2006.01)
*G01R 31/26* (2006.01)

(52) U.S. Cl. .................................. 324/762.01
(58) Field of Classification Search .................. None
See application file for complete search history.

(56) References Cited

U.S. PATENT DOCUMENTS

| | | | |
|---|---|---|---|
| 4,497,056 A | 1/1985 | Sugimori | |
| 4,707,654 A | 11/1987 | Suzuki et al. | |
| 5,442,643 A | 8/1995 | Adachi | |
| 5,453,991 A | 9/1995 | Suzuki et al. | |
| 5,471,481 A | 11/1995 | Okumoto et al. | |
| 6,065,144 A | 5/2000 | Knoch | |
| 6,275,023 B1 | 8/2001 | Oosaki et al. | |
| 6,275,962 B1 | 8/2001 | Fuller et al. | |
| 6,281,698 B1 | 8/2001 | Sugimoto et al. | |
| 6,349,397 B1 | 2/2002 | Koga et al. | |
| 6,392,427 B1 | 5/2002 | Yang | |
| 6,480,978 B1 | 11/2002 | Roy et al. | |
| 6,483,338 B2 | 11/2002 | Weng et al. | |
| 6,499,121 B1 | 12/2002 | Roy et al. | |
| 6,577,979 B1 | 6/2003 | Okitaka | |
| 7,091,598 B2 | 8/2006 | Fujita et al. | |
| 7,395,476 B2 | 7/2008 | Cowell et al. | |
| 7,421,632 B2 | 9/2008 | Jordan et al. | |
| 7,518,924 B2 * | 4/2009 | Lin | 365/185.18 |
| 7,574,637 B2 | 8/2009 | Ricchetti et al. | |
| 7,743,304 B2 | 6/2010 | Volkerink et al. | |
| 2003/0155941 A1 | 8/2003 | Byun et al. | |
| 2004/0044936 A1 | 3/2004 | Rearick et al. | |

(Continued)

OTHER PUBLICATIONS

International Search Report and Written Opinion for application No. PCT/US2009/034898 mailed on Apr. 7, 2009.

(Continued)

*Primary Examiner* — Roberto Velez
(74) *Attorney, Agent, or Firm* — Holland & Hart LLP (57) ABSTRACT

In one embodiment, apparatus for transmitting and receiving data includes a transmission line network having at least three input/output terminals; at least three transmit/receive units, respectively coupled to the at least three input/output terminals; and a control system. The control system is configured to, depending on a desired direction of data flow over the transmission line network, i) dynamically place each of the transmit/receive units in a transmit mode or a receive mode, and ii) dynamically enable and disable an active termination of each transmit/receive unit. Methods for using this and other related apparatus to transmit and receive data over a transmission line network are also disclosed.

10 Claims, 7 Drawing Sheets

U.S. PATENT DOCUMENTS

| | | |
|---|---|---|
| 2006/0018407 A1* | 1/2006 | Osaka et al. ............... 375/316 |
| 2006/0170453 A1 | 8/2006 | Zerbe et al. |
| 2006/0290361 A1 | 12/2006 | Ellis et al. |
| 2007/0216432 A1 | 9/2007 | Kister |
| 2007/0266288 A1 | 11/2007 | Volkerink et al. |
| 2007/0283197 A1 | 12/2007 | Jordan et al. |
| 2008/0031166 A1* | 2/2008 | Fukuda ........................ 370/297 |

OTHER PUBLICATIONS

U.S. Appl. No. 12/035,378 of Edmundo de la Puente, et al. titled "Parallel Test Circuit with Active Devices", filed Feb. 21, 2008.

* cited by examiner

*Prior Art*

TRANSMIT/RECEIVE UNIT, AND METHODS AND APPARATUS FOR TRANSMITTING SIGNALS BETWEEN TRANSMIT/RECEIVE UNITS

CROSS-REFERENCE TO RELATED APPLICATION

This application is a continuation-in-part of the U.S. patent application of De La Puente et al. entitled "Parallel Test Circuit with Active Devices" (application Ser. No. 12/035,378, filed Feb. 21, 2008), which application is hereby incorporated by reference for all that it discloses. The Ser. No. 12/035,378 application is referred to herein as the '378 application.

BACKGROUND

Figure 7:
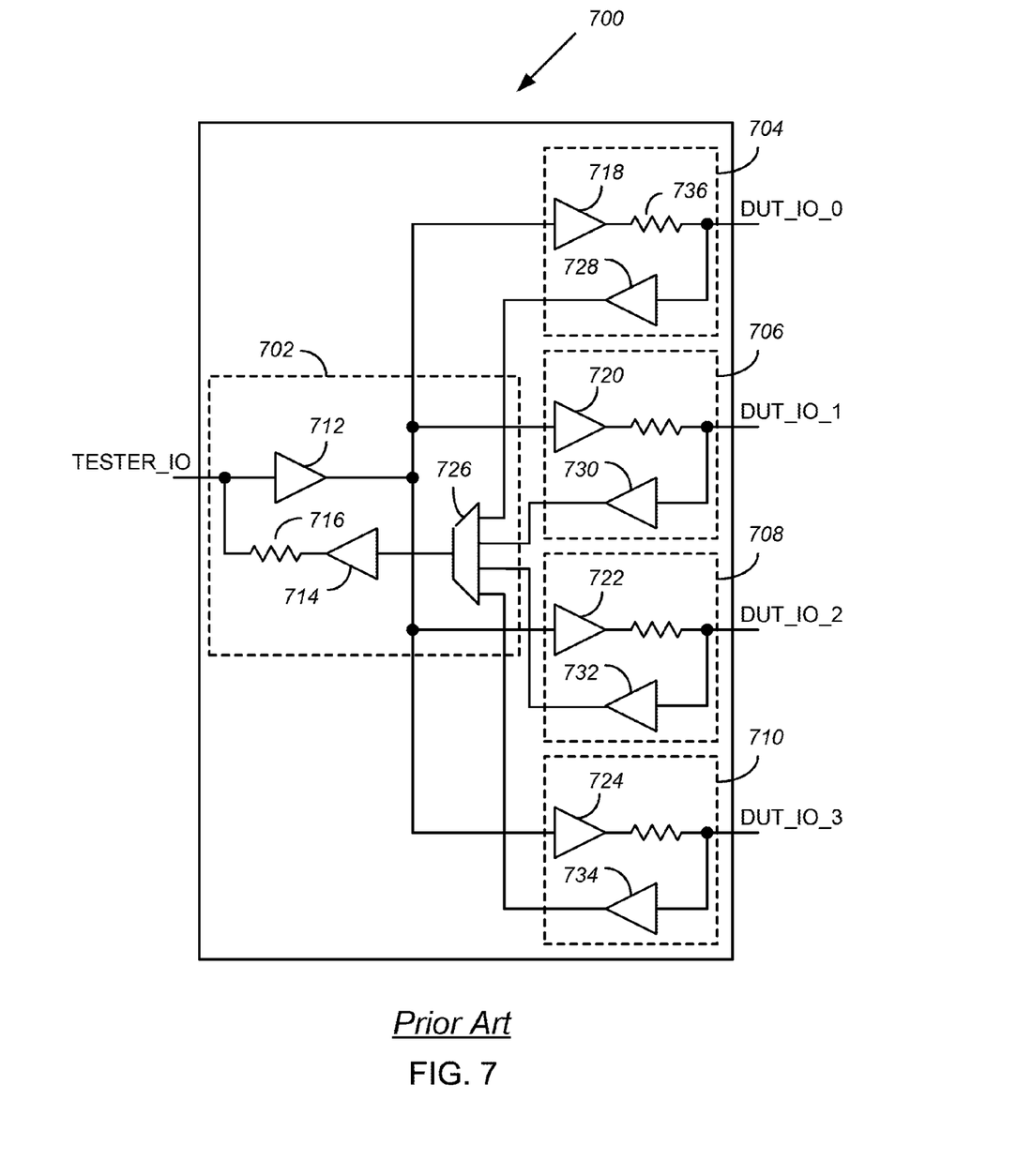
FIG. 7 provides a high-level representation of an exemplary parallel test circuit.

The '378 application discloses a parallel test circuit with active devices. A high-level representation of an exemplary one of the parallel test circuits disclosed in the '378 application is shown in FIG. 7. The parallel test circuit 700 utilizes a channel input/output (I/O or IO) block 702 and four DUT I/O blocks 704, 706, 708, 710 to fan-out/fan-in a signal by four (i.e., 1:4 or 4:1) between a TESTER_IO node and four DUT_IO nodes (DUT_IO_0, DUT_IO_1, DUT_IO_2 and DUT_IO_3).

Each of the channel and DUT I/O blocks 702, 704, 706, 708, 710 comprises an active driver and an active receiver. The labeling of which is which (i.e., which are drivers and which are receivers) is largely a matter of choice. In FIG. 7, the elements that move signals away from the TESTER_IO node, toward one or more of the DUT_IO nodes, are referred to as "drivers". The elements that move signals away from one or more of the DUT_IO nodes, toward the TESTER_IO node, are referred to as "receivers". With this convention in mind, the channel I/O block 702 comprises an active driver 712, an active receiver 714, and a termination resistor 716. The input of the active driver 712 is coupled to the TESTER_IO node, and the output of the active driver 712 is coupled to the inputs of active drivers 718, 720, 722, 724 in each of the DUT I/O blocks 704, 706, 708, 710. Via a multiplexer 726, the input of the active receiver 714 is selectively coupled to the outputs of active receivers 728, 730, 732, 734 in each of the DUT I/O blocks 704, 706, 708, 710. The output of the active receiver 714 is coupled to the TESTER_IO node via the termination resistor 716.

Each of the DUT I/O blocks 704, 706, 708, 710 comprises an active driver (e.g., driver 718), an active receiver (e.g., receiver 728), and a termination resistor (e.g., resistor 736). The output of the active driver in each DUT I/O block is coupled, via a respective termination resistor, to one of the plurality of DUT_IO nodes. Also coupled to each of the DUT_IO nodes is a respective input of one of the active receivers.

In operation, a signal received at the TESTER_IO node of the parallel test circuit 700 may be fanned out to any or all of the DUT_IO nodes, or signals read at any of the DUT_IO nodes may be selectively transmitted back to the TESTER_IO node. In some cases, and as described in the '378 application, the parallel test circuit 700 may be augmented to provide for parallel reads from the DUT_IO nodes.

In theory, the parallel test circuits described in the '378 application can be expanded by coupling a single channel I/O block 702 to increasing numbers of DUT I/O blocks 704, 706, 708, 710, thereby increasing signal fan-out/fan-in by any number of signal paths (e.g., by 4, by 8, or by any other number of signal paths). In practice, however, it becomes more difficult to maintain signal integrity and DUT isolation as the fan-out/fan-in of a single parallel test circuit 700 is increased. For example, as more DUT I/O blocks 704, 706, 708, 710 are coupled to a single channel I/O block 702, it becomes more difficult to route signals between the DUT I/O blocks 704, 706, 708, 710 and the channel I/O block 702 such that like signal propagation characteristics are maintained amongst the different signal routes.

Even if the fan-out/fan-in of a single parallel test circuit can be increased while maintaining signal integrity, there are applications in which this might not be desirable. For example, a parallel test circuit with increased fan-out/fan-in may be less useful, or even cost-prohibitive, in applications where the increased fan-out/fan-in is not always needed (or not needed at all). As a result, it sometimes desirable to balance 1) the increased fan-out/fan-in needs of some applications, with 2) the modularity that lower order fan-out/fan-in circuits provide.

BRIEF DESCRIPTION OF THE DRAWINGS

Illustrative embodiments of the invention are illustrated in the drawings, in which.

DETAILED DESCRIPTION

Disclosed herein are methods and apparatus for transmitting signals between at least three transmit/receive units, each of which is coupled to a transmission line network. In some embodiments, the methods and apparatus can be used to fan-out/fan-in a fully bi-directional signal path by two (i.e., 1:2 or 2:1). See, for example, the exemplary apparatus 100 shown in FIG. 1. The apparatus 100 comprises a test system 102 coupled to each of two parallel test circuits 106, 108. Each of the parallel test circuits 106, 108 may be constructed as described in the '378 application, or in other ways. Each of the test system 102 and the parallel test circuits 106, 108 comprises a transmit/receive unit 110, 112, 114 that couples a respective one of the test system 102 and parallel test circuits 106, 108 to a transmission line network 104. If each of the parallel test circuits 106, 108 fans-in/fans-out a signal by four (i.e., 1:4 or 4:1), the test system 100 may provide a single test signal to an array of up to eight device under test input/outputs (DUT I/Os) 116. If the transmit/receive unit 112, 114 of each parallel test circuit 106, 108 is coupled to an active driver "per DUT I/O" (i.e., similarly to what is shown in FIG. 7), and if the active drivers per DUT I/O are individually controllable (i.e., each is able to be placed in an ON or OFF state), then the test system 102 may provide a single test signal to any one or combination of the DUT I/Os 116. Similarly, in a reverse flow through the apparatus 100, the test system 102 may receive signals from any of the DUT I/Os 116.

Figure 1:
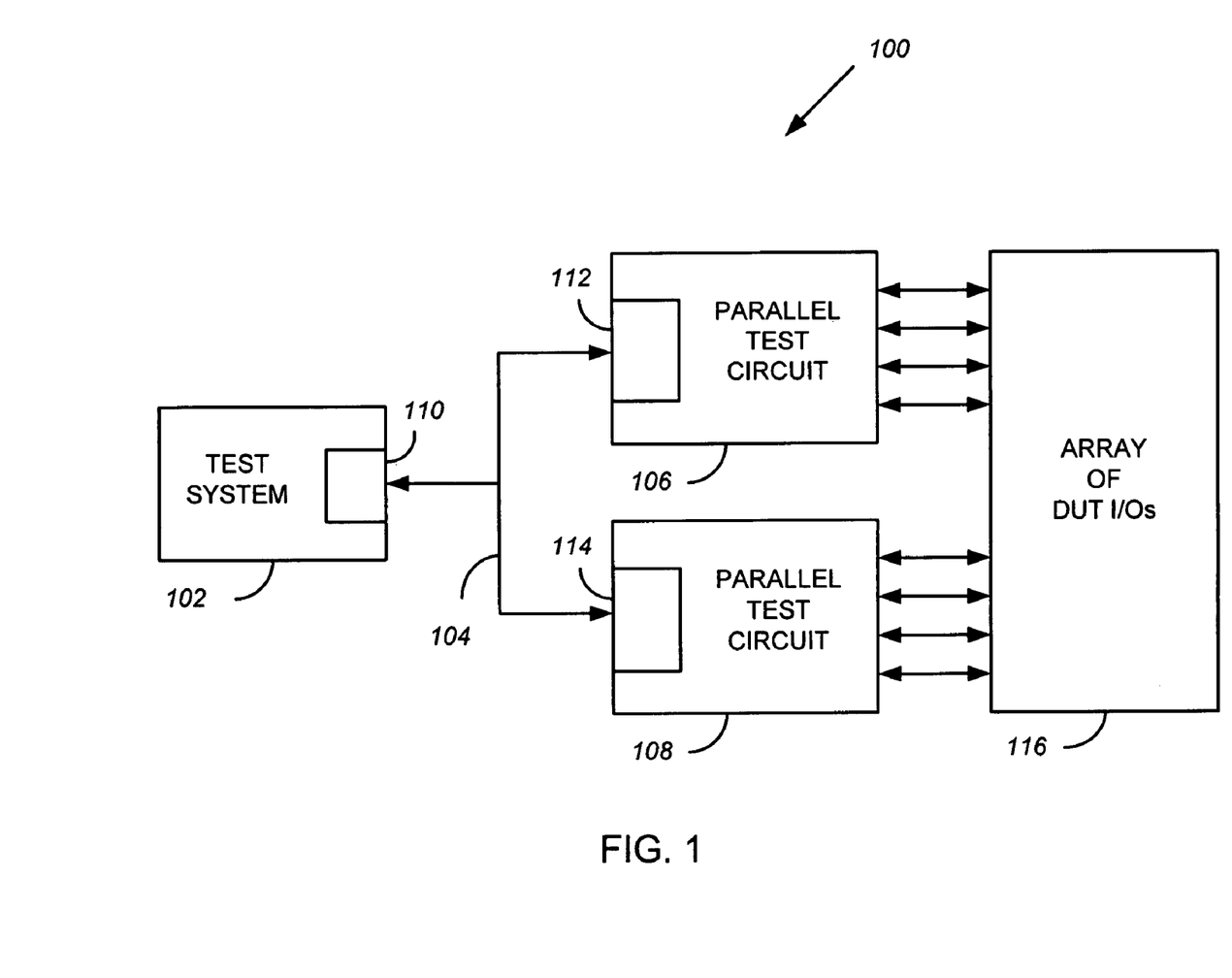
FIG. 1 illustrates exemplary apparatus for transmitting signals between at least three transmit/receive units, each of which is coupled to a transmission line network.

Although FIG. 1 illustrates exemplary apparatus 100 having three transmit/receive units 110, 112, 114 coupled to a transmission line network 104, the methods and apparatus disclosed herein may be used to couple more or fewer (for example, two) transmit/receive units to a transmission line network. This said, the methods and apparatus disclosed are particularly suited for networks requiring an increase in fan-out and fan-in by two.

Figure 2:
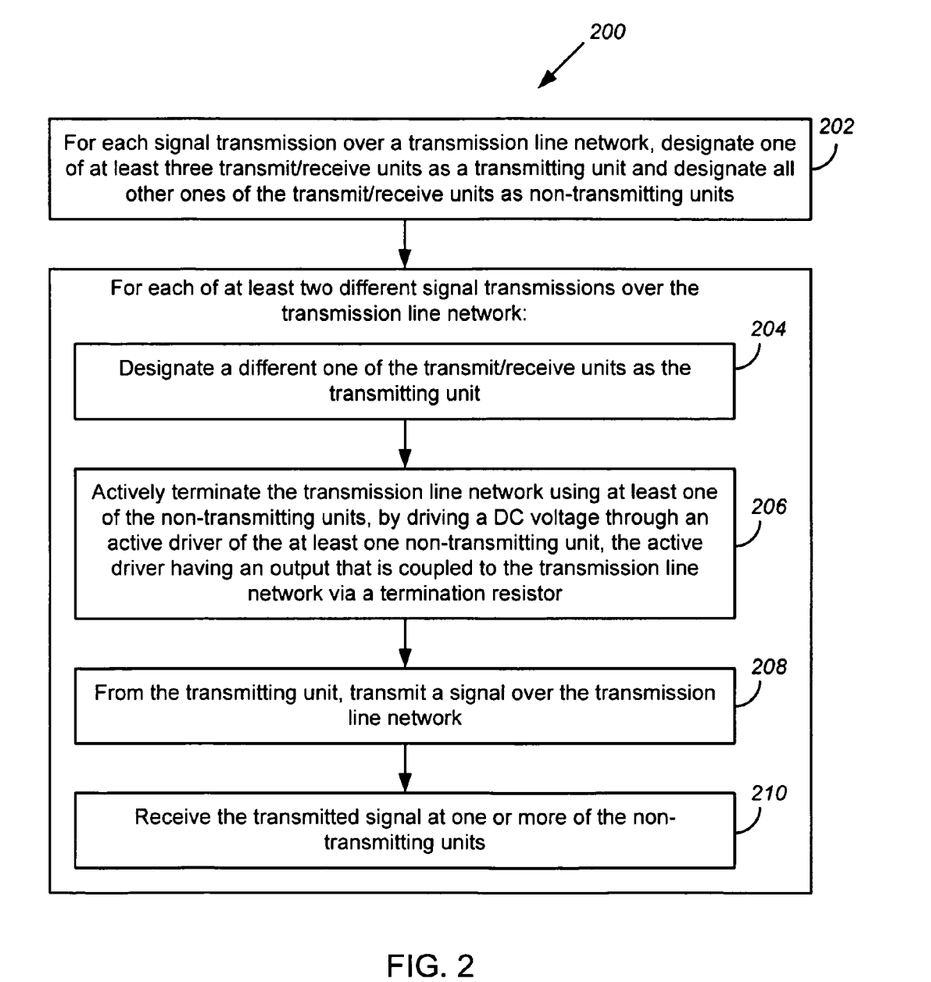
FIG. 2 illustrates an exemplary method for transmitting signals between at least three transmit/receive units coupled to a transmission line network.

In the above context, FIG. 2 illustrates an exemplary method 200 for transmitting signals between at least three transmit/receive units coupled to a transmission line network. The method comprises, for each signal transmission over the transmission line network, designating one of the transmit/receive units as a transmitting unit and designating all other ones of the transmit/receive units as non-transmitting units (at block 202). The method 200 further comprises, for each of at least two different signal transmissions over the transmission line network, 1) designating a different one of the transmit/receive units as the transmitting unit (at block 204), 2) actively terminating the transmission line network using at least one of the non-transmitting units (at block 206), 3) transmitting a signal over the transmission line network, the singal being transmitted from the transmitting unit (at block 208), and 4) receiving the transmitted signal at one or more of the non-transmitting units (at block 210). The transmission line network is actively terminated by driving a DC voltage through an active driver of a non-transmitting unit, which active driver has an output that is coupled to the transmission line network via a termination resistor. Typically, but not necessarily, all of the non-transmitting units will be configured to terminate the transmission line.

When the non-transmitting units coupled to transmission line network are actively terminated, signals may be transmitted by a transmitting unit, and received by one or more of the non-transmitting units, with good signal integrity. And by selectively enabling and disabling the active termination provided by transmit/receive units, depending one whether they are configured as a transmitting or non-transmitting unit during a particular signal transmission, signals may be transmitted with good signal integrity in any direction over the transmission line network.

Figure 3:
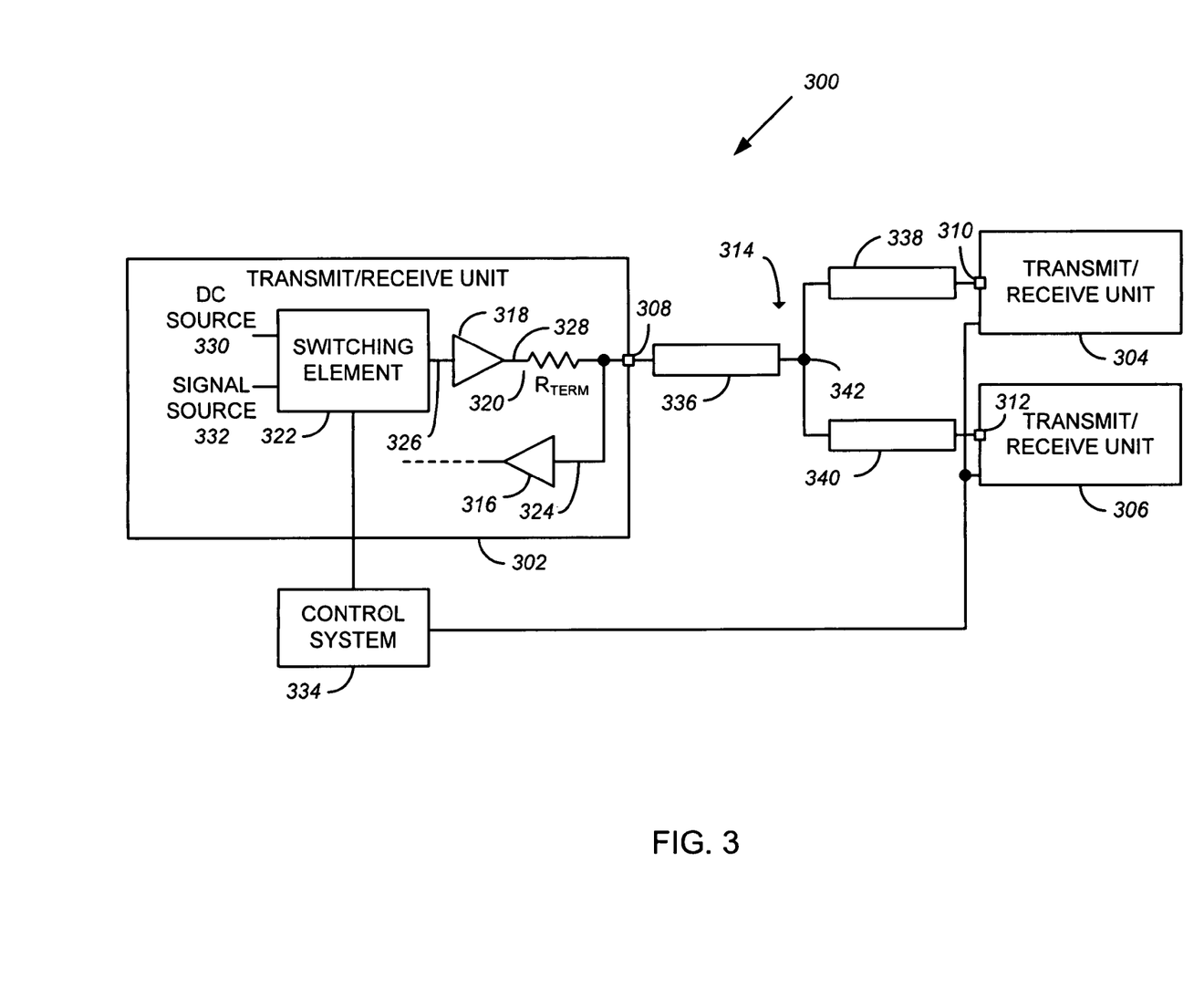
FIG. 3 illustrates exemplary apparatus for implementing the method shown in FIG. 2.

The exemplary method 200 can be better understood by referring to exemplary apparatus for implementing the method 300. One exemplary collection 300 of apparatus is shown in FIG. 3, in which three transmit/receive units 302, 304, 306 are respectively coupled to three input/output (I/O) terminals 308, 310, 312 of a transmission line network 314. In FIG. 3, the elements that move signals toward the transmission line network are referred to as "drivers", and the elements that move signals away from the transmission line network are referred to as "receivers". With this convention in mind, each of the transmit/receive units comprises an active receiver 316, an active driver 318, a termination resistor 320, and a switching element 322. Each of the active receivers 316 has a receiver input 324 coupled to a respective one of the I/O terminals 308. Each of the active drivers 318 has a driver input 326 coupled to a driver output 328. A termination resistor 320 couples the driver output 328 to a respective one of the I/O terminals 308. The switching element 322 is configured to selectively couple the driver input 326 to a DC voltage source 330. The switching element 322 may also be configured to selectively couple the driver input 326 to a signal source 332.

A control system 334 may be coupled to, or integrated with, the apparatus 300. The control system 334 couples to the switching elements 322 of the at least three transmit/receive units 302, 304, 306 and configures the switching elements 322 to A) couple the driver input 326 and signal source 332 of a transmitting one 302 of the transmit/receive units, and B) couple the driver input 326 and DC voltage source 330 of at least one non-transmitting one 304, 306 of the transmit/receive units.

Figure 4:
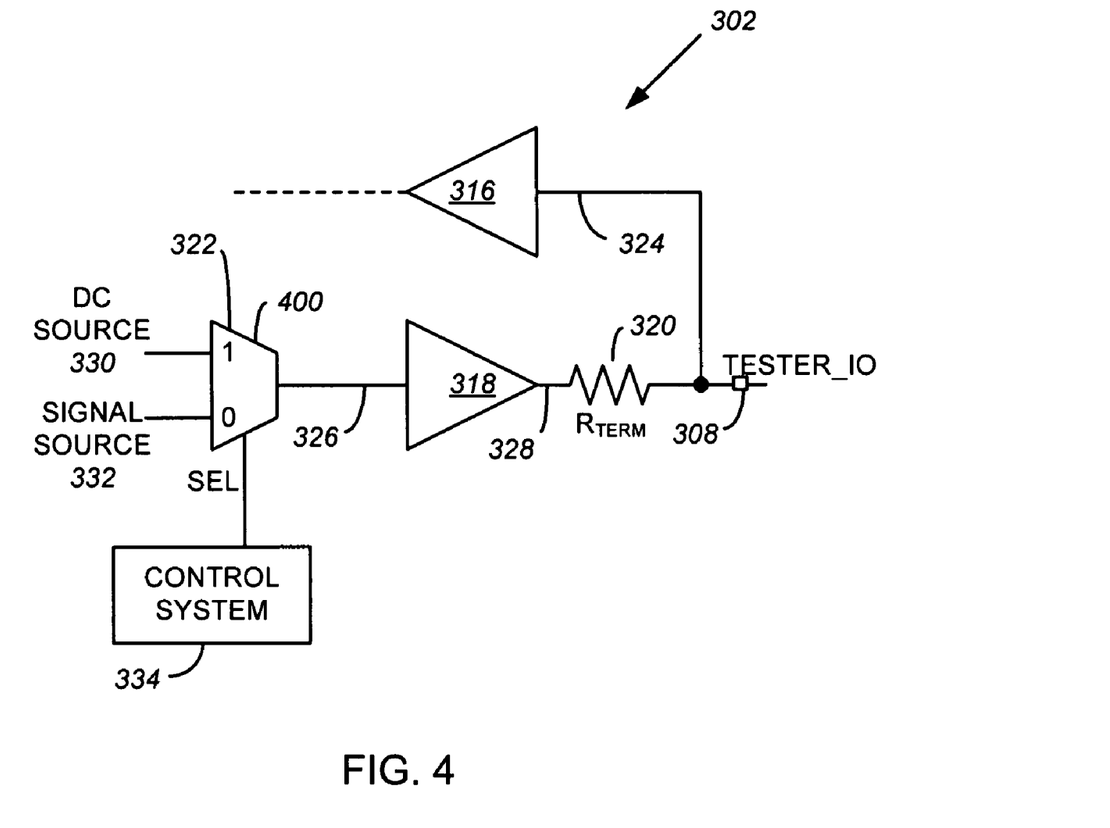
FIG. 4 illustrates an exemplary implementation of one of the switching elements shown in FIG. 3, as well as an exemplary way in which the control system shown in FIG. 3 may be coupled with the switching element.

FIG. 4 illustrates an exemplary implementation of one of the switching elements 322, as well as an exemplary way in which the control system 334 may be coupled with the switching element 322. By way of example, the switching element 322 is shown to comprise a multiplexer 400 having first and second multiplexer inputs (labeled "1" and "0"), a multiplexer output coupled to the driver input 326, and a select input (labeled "SEL"). The DC voltage source 330 is coupled to the first multiplexer input, and the signal source 332 is coupled to the second multiplexer input. The control system 334 is coupled to the select input of the multiplexer 400. During use of the transmit/receive unit 302, the control system 334 may configure the multiplexer 400 to couple the driver input 326 and signal source 332 (i.e., when the transmit/receive unit 302 is configured as a transmitting unit), and B) couple the driver input 326 and the DC voltage source 330 (i.e., when the transmit/receive unit 302 is configured as a non-transmitting unit). If each of the transmit/receive units 302, 304, 306 shown in FIG. 3 is constructed similarly to the transmit/receive unit 302 shown in FIG. 4, the control system 334 may also be configured to A) couple the driver input and signal source of any transmit/receive unit that is designated a transmitting unit, and B) couple the driver input and DC voltage source of any transmit/receive unit that is designated a non-transmitting unit.

Referring back to FIG. 1, FIG. 1 illustrates how the transmission line network shown in FIG. 3 can be used to fan-out a single test channel of a test system 102 (e.g., a circuit tester) to two of the parallel test circuits 106, 108 disclosed in the '378 application (and ultimately, to a plurality of DUT I/Os 116). Depending on a desired direction of data flow over the transmission line network 104, a control system such as the one disclosed in FIGS. 3 and 4 may be configured to 1) dynamically place each of the transmit/receive units 110, 112, 114 in a transmit mode or a receive mode, and 2) dynamically enable and disable an active termination of each transmit/receive unit 110, 112, 114.

Figure 5:
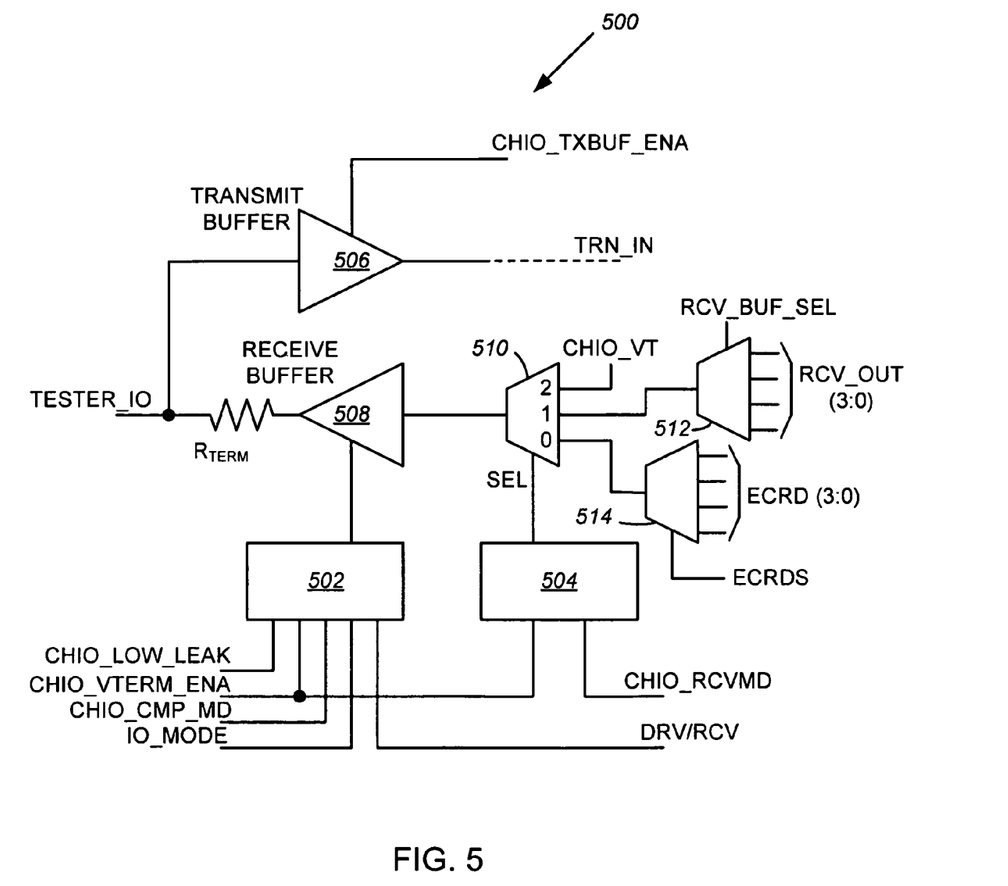
FIG. 5 illustrates in more detail how the transmit/receive unit of one of the parallel test circuits shown in FIG. 1 may be configured.

FIG. 5 illustrates in more detail how the transmit/receive unit 112, 114 of one of the parallel test circuits 106, 108 shown in FIG. 1 may be configured. Note that the transmit/receive unit 500 (FIG. 5) is in many ways configured similarly to the generic transmit/receive unit 302 shown in FIG. 4. However, the control system 502, 504 shown in FIG. 5 is more robust, for providing some of the additional functionality disclosed in the '378 application.

Note that the driver 506 in FIG. 5, labeled "Transmit Buffer", moves signals away from the TESTER_IO node, toward one or more DUT_IO nodes coupled to TRN_IN. The receiver 508, labeled "Receive Buffer", moves signals from one of the DUT_IO nodes coupled to RCV_IN, toward the TESTER_IO node.

The control system 502, 504 shown in FIG. 5 receives a plurality of signals (CHIO_TXBUF_ENA, CHIO_LOW_LEAK, CHIO_VTERM_ENA, CHIO_CMP_MD, IO_MODE, CHIO_RCVMD, DRV/RCV). Some or all of these signals may be provided to a parallel test circuit by, for example, a test system such as the test system 102 (see FIG. 1). By controlling these various signals, the transmit/receive unit 500 may be placed in a number of different modes, including: Drive, Receive and Low Leakage modes. Note that, for purposes of this description, "Drive" mode is indicative of a data flow where a test system is driving data to DUT I/Os through the parallel test circuit 500, and "Receive" mode is indicative of a data flow where the test system is receiving data from DUT I/Os through the parallel test circuit 500.

Drive mode can be selected by setting IO_MODE=1 (for Drive-only mode), or by setting IO_MODE=0 and DRV_RCV=1 (to Drive in bidirectional mode). In Drive mode, the Transmit Buffer 506 receives a signal from a test system (a tester) via TESTER_IO, buffers it, and distributes it to all DUT I/O drivers (referred to as DUT_IO drivers in the '378 application). Input termination can be ON or OFF, as controlled by CHIO_VTERM_ENA. When the termination is enabled, the Receive Buffer 508 is turned ON and the Receiver Buffer's source will be CHIO_VT, which is a termination voltage. When the termination is disabled, the Receive Buffer 508 is turned OFF.

Receive mode can be selected by setting IO_MODE=0 and DRV_RCV=0 (to Receive in bidirectional mode), or by setting IO_MODE=2 (when in ECRD compare mode). ECRD compare mode is described later in this description. CHIO_VTERM_ENA has no effect on termination in either of the receive modes.

The bidirectional receive mode may also be referred to as a "Bypass" mode. Bypass mode is further enabled by setting CHIO_RCVMD=0 and CHIO_VTERM_ENA=0. When this mode is selected/enabled, one of the RCV_OUT signals is coupled to the input of the Receive Buffer 508 through the multiplexers 510 and 512, enabling RCV_OUT to drive the TESTER_IO node. At any point in time, RCV_OUT originates from one of the DUT I/Os, as determined by RCV_BUF_SEL. By serially coupling the TESTER_IO node to the different RCV_OUT signals, various DUT I/O signals can be serially output to a test system coupled to the TESTER_ IO node.

The ECRD compare mode is further enabled by setting CHIO_RCVMD=1 and CHIO_VTERM_ENA=0. When this mode is selected/enabled, one of the ECRD signals is coupled to the input of the Receiver Buffer 508 through the multiplexers 510 and 514, enabling ECRD to drive the TESTER_IO node. At any point in time, ECRD originates from one of a plurality of comparators, as determined by ECRDS. Each of the comparators (not shown) compares one of the DUT I/O signals to an expected DUT I/O signal and generates one of the ECRD signals.

Note that the Transmit Buffer 506 is controlled separately by CHIO_TXBUF_ENA. Although the Transmit Buffer 506 could be left ON all the time, thereby obviating the need for a CHIO_TXBUF_ENA signal, it can be desirable to turn the Transmit Buffer 506 OFF when driving ECRD signals to the TESTER_IO node. Turning the Transmit Buffer 506 OFF in ECRD mode mitigates signal feedback being picked up by the transmit/receive unit 500. It is desirable, however, to turn the Transmit Buffer 506 ON when driving RCV_OUT signals to the TESTER_IO node. This eliminates the existence of a non-terminated stub on the transmission line network coupled to the TESTER_IO node.

Low leakage mode can be selected by setting CHIO_LOW_LEAK=1. In low leakage mode, the overall leakage at the TESTER_IO node goes to <5 nA (nanoAmps).

The exemplary transmission line networks discussed so far (see, FIGS. 1 and 3) have been coupled to only three transmit/receive units, and as shown in FIG. 3, each transmit/receive unit 302, 304, 306 is coupled to its own transmission line segment 336, 338, 340, with all of the transmission line segments 336, 338, 340 being coupled to a common branch node 342. In other embodiments, a transmission line network could be coupled to more or fewer transmit/receive units. Preferably, a transmission line network is extended by branching more transmission line segments from a common branch node. However, it is also possible to add an additional branch node or nodes to a transmission line network, or to couple two or more transmit/receive units to a single transmission line segment. Doing so, however, may require transmit/receive units to provide different amounts of compensation for signal delay and other factors. Also, the attachment of multiple transmit/receive units to a single transmission line segment, or the addition of branch nodes to a transmission line network, may lead to more signal degradation at some or all of the transmit/receive units coupled to the transmission line network (e.g., because of the increased impact of the resistive divider created by the additional transmission line branching).

In some embodiments, each of the transmission line segments in a transmission line network (such as one of the networks 104, 314 shown in FIGS. 1 or 3) is configured to have the same characteristic impedance. So long as the receivers of non-transmitting units are actively terminated, there is no need to step the characteristic impedances of different segments based on an expected direction of data flow over a transmission line network.

By way of example, each of the transmission line segments in a transmission line network may have a characteristic impedance of 50 Ohms. 50 Ohms is a useful characteristic impedance because 50 Ohm transmission lines are commonplace in today's communications networks. However, the methods and apparatus disclosed herein are not limited to use with 50 Ohm transmission line segments. In particular applications, transmission line segments having other characteristic impedances may be useful.

Figure 6:
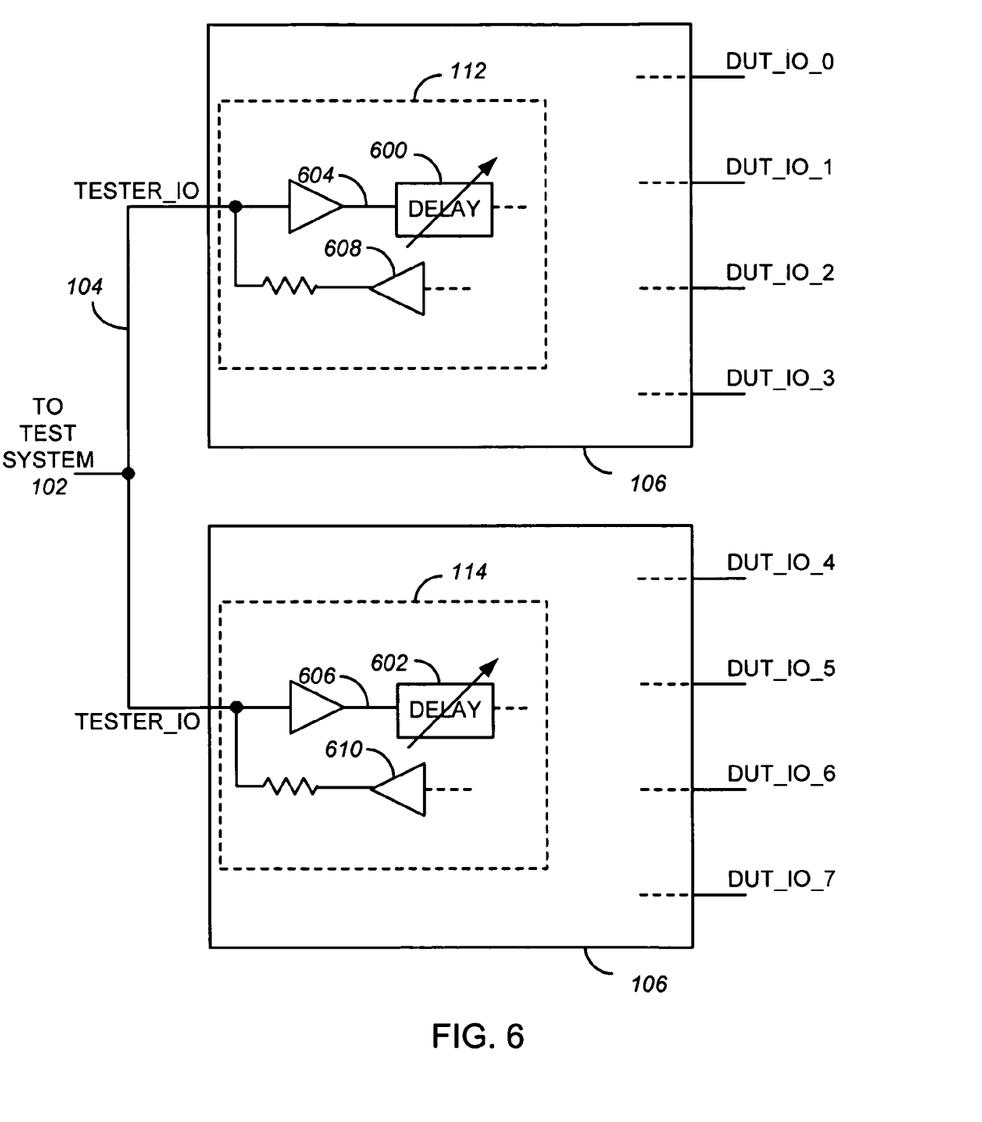
FIG. 6 illustrates an exemplary way to configure the transmit/receive unit of each parallel test circuit shown in FIG. 1, so that the signal delay between the parallel test circuits may be adjusted.

FIG. 6 illustrates an exemplary way to configure the transmit/receive unit 112, 114 of each parallel test circuit 106, 108 shown in FIG. 1, so that the signal delay between the parallel test circuits 106, 108 can be adjusted. As shown, each of the parallel test circuits 106, 108 is provided with an adjustable delay element 600, 602; and an input of each adjustable delay element 600, 602 is coupled to a respective receiver output 604, 606 of one of the transmit/receive units 106, 108. To adjust the signal delay between the parallel test circuits 106, 108, one of the active drivers 608, 610 may be opened at a time, and time-domain reflectometry (TDR) may be used to calculate the round-trip signal delay from the test system 102 to one of the parallel test circuits 106, 108. In some cases, the output of each adjustable delay element 600, 602 may be coupled to the inputs of a plurality of drivers, which drivers increase the signal fan-out of a parallel test circuit 106, 108 (as described in the '378 application, and as shown in FIG. 7). In such a case, TDR may be used to calculate the round-trip signal delay to the DUT I/O drivers. Alternately, one of the drivers may be opened at a time, and TDR may be used to calculate the round-trip signal delay to each of a plurality of DUT I/Os. In this latter case, the delay of an adjustable delay element 600 or 602 may be set based on an average of the round-trip signal delays; based on a longest or shortest round-trip signal delay; or based on other metrics. A delay controller, which may in some cases be part of control system 334 (FIG. 3) may be configured to adjust the delays of the first and second adjustable delay elements 600, 602. By way of example, the delay controller may be integrated with the test system 102.

The methods and apparatus disclosed herein can be advantageously employed in many applications. However, one application in which they are particularly useful is test and measurement. If the apparatus shown in FIG. 1 is incorporated into a test and measurement environment, the active driver of the transmit/receive unit 110 may be configured to transmit signals carrying timing and voltage information over the transmission line network 104, and the transmission line network 104 can 1) split the signals, and 2) provide the signals to the transmit/receive units 112, 114 of the parallel test circuits 106, 108. In reverse, the active drivers of the transmit/receive units 112, 114 in the parallel test circuits 106, 108 can, one at a time, be configured to transmit signals carrying timing and voltage information over the transmission line network 104. The signals transmitted by the parallel test circuits 106, 108 can then be received by the test system 102. In either direction, signals transmitted over the transmission line network can be transmitted and received with good integrity, in part because of the active termination of the network by any transmit/receive unit that is not transmitting.

What is claimed is:

1. Apparatus for transmitting and receiving data, comprising:
   a transmission line network having at least three input/output terminals;
   at least three transmit/receive units, respectively coupled to the at least three input/output terminals, each of the transmit/receive units having
      i) an active receiver having a receiver input coupled to a respective one of the input/output terminals;
      ii) an active driver having a driver input coupled to a driver output;
      iii) a termination resistor coupling the driver output to a respective one of the input/output terminals; and
      iv) a switching element configured to selectively couple the driver input to a DC voltage source and a signal source; and
   a control system coupled to the switching elements of the at least three transmit/receive units, the control system configuring the switching elements of the transmit/receive units to A) couple the driver input and the signal source of a transmitting one of the transmit/receive units, and B) couple the driver input and DC voltage source of at least one non-transmitting one of the transmit/receive units.

2. The apparatus of claim 1, wherein for each of the transmit/receive units, the switching element of the respective transmit/receive unit comprises:
   a multiplexer having first and second multiplexer inputs, a multiplexer output coupled to the driver input, and a select input; wherein the DC voltage source is coupled to the first multiplexer input and the signal source is coupled to the second multiplexer input.

3. The apparatus of claim 2, further comprising:
   a control system coupled to the select inputs of the multiplexers, the control system configuring the multiplexers to A) couple the driver input and the signal source of a transmitting one of the transmit/receive units, and B) couple the driver input and the DC voltage source of other ones of the transmit/receive units.

4. The apparatus of claim 1, wherein the at least three transmit/receive units consist of three transmit/receive units.

5. The apparatus of claim 1, wherein the transmission line network comprises three transmission line segments, each of the transmission line segments having first and second ends, wherein the first ends of the transmission line segments are coupled to respective ones of the transmit/receive units, and wherein the second ends of the transmission line segments are coupled to one another at a common branching node.

6. The apparatus of claim 5, wherein each of the three transmission lines has a characteristic impedance of 50 Ohms.

7. The apparatus of claim 1, wherein the transmission line network defines a 1:2 signal fan-out from a first one of the transmit/receive units to second and third ones of the transmit/receive units.

8. The apparatus of claim 7, further comprising:
   a first adjustable delay element coupled to a receiver output of the active receiver of the second transmit/receive unit;
   a second adjustable delay element coupled to a receiver output of the active receiver of the third transmit/receive unit; and
   a delay controller configured to adjust delays of the first and second adjustable delay elements.

9. Apparatus for transmitting and receiving data, comprising:
   a transmission line network having at least three input/output terminals;
   at least three transmit/receive units, respectively coupled to the at least three input/output terminals, each of the transmit/receive units having
      i) an active receiver having a receiver input coupled to a respective one of the input/output terminals;
      ii) an active driver having a driver input coupled to a driver output;
      iii) a termination resistor coupling the driver output to a respective one of the input/output terminals; and
      iv) a switching element configured to selectively couple the driver input to a DC voltage source;
   wherein the active driver of a first one of the transmit/receive units is configured to transmit signals carrying timing and voltage information over the transmission line network, and wherein the transmission line network is configured to split the signals and provide the signals to second and third ones of the transmit/receive units.

10. Apparatus for transmitting and receiving data, comprising:
   a transmission line network having at least three input/output terminals;
   at least three transmit/receive units, respectively coupled to the at least three input/output terminals, each of the transmit/receive units having
      i) an active receiver having a receiver input coupled to a respective one of the input/output terminals;
      ii) an active driver having a driver input coupled to a driver output;
      iii) a termination resistor coupling the driver output to a respective one of the input/output terminals; and
      iv) a switching element configured to selectively couple the driver input to a DC voltage source;
   wherein first and second ones of the transmit/receive units are configured to transmit signals carrying timing and voltage information over the transmission line network, and wherein the transmission line network is configured to provide the signals driven by the first and second ones of the transmit/receive units to a third one of the transmit/receive units.

* * * * *